United States Patent
Callaway, Jr. et al.

(10) Patent No.: US 7,564,842 B2
(45) Date of Patent: Jul. 21, 2009

(54) METHODS AND APPARATUSES FOR ROUTING DATA IN A PERSONAL AREA NETWORK

(75) Inventors: Edgar Herbert Callaway, Jr., Boca Raton, FL (US); Lance Eric Hester, Sunrise, FL (US); Vernon Anthony Allen, Fort Lauderdale, FL (US); Jasmeet Chhabra, Hillsboro, OR (US); Lakshman Krishnamurthy, Portland, OR (US); Ralph M. Kling, Sunnyvale, CA (US); Zafer Sahinoglu, Somerville, MA (US); Philip V. Orlik, Cambridge, MA (US); Phil Jamieson, Dorking (GB); Phil Rudland, Horley (GB); Zachary Smith, Bayerville, MA (US); Myung J. Lee, Paramus, NJ (US); Xuhui Hu, Brooklyn, NY (US); Yong Liu, Brooklyn, NY (US); Chunhui Zhu, Rego Park, NY (US)

(73) Assignees: Mitsubishi Electric Research Laboratories, Inc., Cambridge, MA (US); Samsung Electronics Co. Ltd. (KR); Intel Corporation, Santa Clara, CA (US); NXP B.V. (NL); Motorola, Inc., Schaumburg, IL (US)

( * ) Notice: Subject to any disclaimer, the term of this patent is extended or adjusted under 35 U.S.C. 154(b) by 854 days.

(21) Appl. No.: 10/882,808

(22) Filed: Jul. 1, 2004

(65) Prior Publication Data
US 2005/0135379 A1    Jun. 23, 2005

Related U.S. Application Data

(60) Provisional application No. 60/484,594, filed on Jul. 2, 2003.

(51) Int. Cl.
*H04L 12/28* (2006.01)
*H04L 12/56* (2006.01)

(52) U.S. Cl. .................................... 370/389; 370/395.31
(58) Field of Classification Search ........................ None
See application file for complete search history.

(56) References Cited

U.S. PATENT DOCUMENTS 5,538,007 A    7/1996  Gorman
6,172,980 B1 *  1/2001  Flanders et al. ............. 370/401

(Continued)

FOREIGN PATENT DOCUMENTS

CA    2 424 992        4/2003
EP    0 465 201 A2     7/1991

(Continued)

OTHER PUBLICATIONS

Lin, Yin-Dar, et al. "Brouter: The Transparent Bridge with Shortest Path in Interconnected LANs" Local Computer Networks, 1991. Proceedings., 16th Conference on Minneapolis, MN, US, Oct. 14-17, 1991, Los Alamitos, CA, IEEE Computer Society, US, Oct. 14, 1991.

(Continued)

*Primary Examiner*—Gregory B Sefcheck
*Assistant Examiner*—Dargaye H Churnet
(74) *Attorney, Agent, or Firm*—DLA Piper LLP (US)

(57) ABSTRACT

The disclosure is a routing method for data in a personal area network. The personal area network includes a plurality of nodes. The method includes receiving a frame at a node, determining whether the node contains a routing table entry for the frame destination, and when the node contains a routing table entry, determining a route for the frame based on a first routing protocol. The method further includes, when the node does not contain a routing table entry for the frame destination, determining whether a route should be discovered for the frame destination, and when a route should not be discovered, determining a route for the frame based on a second routing protocol.

53 Claims, 10 Drawing Sheets

U.S. PATENT DOCUMENTS

| | | | |
|---|---|---|---|
| 6,778,532 B1* | 8/2004 | Akahane et al. | 370/392 |
| 2002/0145978 A1* | 10/2002 | Batsell et al. | 370/238 |
| 2003/0227931 A1 | 12/2003 | Chen et al. | |
| 2004/0165532 A1 | 8/2004 | Poor et al. | |
| 2004/0233847 A1 | 11/2004 | Park et al. | |
| 2004/0233882 A1 | 11/2004 | Park et al. | |
| 2005/0036486 A1* | 2/2005 | Sahinoglu et al. | 370/389 |

FOREIGN PATENT DOCUMENTS

| | | |
|---|---|---|
| EP | 0 537 408 A1 | 10/1991 |
| EP | 0 518 595 A2 | 6/1992 |
| KR | 10-2004-0084309 | 10/2004 |
| WO | WO 97/02680 | 1/1997 |
| WO | WO 03/105356 A1 | 12/2003 |

OTHER PUBLICATIONS

Catania, Vincenzo et al. "A Routing Strategy for Man Interconnection." Networking in the Nineties. Bal Harbor Apr. 7-11, 1001, Proceedings of The Annual Joint Conference of the Computer and Communications Societies. (INFOCOM) New York, IEEE, vol. 2 Conf. 10, Apr. 7, 1991.

Privat, Gilles. "A System-Architecture Viewpoint on Smart Networked Devices." *Microelectronic Engineering*, Eslevier Publishers BV, Amsterdam, Netherlands. vol. 54, No. 1-2. Dec. 2000.

Royer, Elizabeth et al. "A Review of Current Routing Protocols for Ad Hoc Mobile Wireless Networks." IEEE Personal Communications, IEEE Communications Society, US, vol. 6, No. 2, Apr. 1999.

Pitt, Daniel A., et al. "Table-Free Bridging." IEE Journal on Selected Areas in Communications, IEEE Inc., New York. vol. SAC-5, No. 9. Dec. 1987.

Perkins, Charles E., et al. "Ad-hoc On-Demand Distance Vector Routing." Proceedings WMCSA, Feb. 25, 1999, pp. 90-100.

Garcia-Luna-Aceves, J.J., et al. "Wireless Internet Gateways (Wings)". MILCOM 97 Proceedings Monterery, CA Nov. 2-5, 1997; New York, IEEE, vol. 3, Nov. 2, 1997.

Royer et al. "Transmission Range Effects on AODV Multicast Communication". Mobile Networks and Applications. Oct. 30, 2000.

"WiFi and Bluetooth: An Examination of Coexistance Approaches". Mobilian Corporation, 2001.

* cited by examiner

| Field Name | Size | Description |
|---|---|---|
| Destination address | 2 bytes | The address of this route. |
| Status | 3 bits | The status of this route (DISCOVERY_UNDERWAY, ACTIVE, etc.). |
| Next-hop address | 2 bytes | The network address of the next hop on the way to the destination. |

Fig. 4

| Field Name | Size | Description |
| --- | --- | --- |
| Route request identifier | 1 byte | A sequence number for a route request (RREQ) frame that is incremented each time a node initiates a route request. |
| Source address | 2 bytes | The network address of the RREQ's initiator. |
| Sender address | 2 bytes | The network address of the node that has sent the most recent, lowest cost RREQ frame corresponding to this entry's route request identifier and source address. This field is used to determine the path that an eventual RREP frame should follow. |
| Forward cost | 1 byte | The accumulated path cost from the source of the route request to the present device. |
| Residual cost | 1 byte | The accumulated path cost from the current device to the destination device. |
| Expiration time | 2 bytes | A countdown timer indicating the time until route discovery expires. |

Fig. 5

| Bytes: 1 | 1 | 1 | 2 | 1 |
|---|---|---|---|---|
| Frame identifier | Command options | Route request identifier | Destination address | Path cost |

Fig. 8

| Bytes: 1 | 1 | 1 | 2 | 1 |
|---|---|---|---|---|
| Frame identifier | Command options | Route request identifier | Originator address | Path cost |

Fig. 9

METHODS AND APPARATUSES FOR ROUTING DATA IN A PERSONAL AREA NETWORK

This application claims the benefit and priority of U.S. provisional application Ser. No. 60/484,594, filed on Jul. 2, 2003, and entitled "Communication System."

FIELD OF THE INVENTION

This disclosure relates generally to communication networks, and more particularly to routing data in a personal area network.

BACKGROUND OF THE INVENTION

For several years remote control devices have been common in the consumer electronics industry. These devices include controllers for televisions, radios and multimedia computers. Moreover, remote control capabilities have recently been extended to "smart" versions of more traditional products such as refrigerators, washers, dryers, garage door openers, lawn irrigation systems and climate controls. Given their popularity, it is quite clear that the number of products with remote control capabilities will only increase. Furthermore, as new features are added to these products, the complexity of the remote control capabilities and features for these products will also increase.

A one-to-one relationship predominates between products and their remote control devices. Generally, the remote control devices are designed specifically for the product for which they were manufactured. As a result, there is little uniformity in the features offered by manufacturers even for the same type of product. Furthermore, there is little interoperability between manufacturers' software used to program the remote control devices due to the fact that, in many cases, each manufacturer utilizes proprietary software.

Thus, the current situation has led to a world in which the typical household contains numerous remote control devices, not only to control several different products, but many of which to perform the same task for the different products or even for the same type of product. For example, an on/off switch is included for nearly every remote control situation, but oftentimes a different on/off switch is required for each television, radio, light fixture, and so on. Even products made by the same manufacturer may contain different software and thus, remote control devices that are not compatible. As such, a household will typically have as many remote control devices as products to control. In an increasingly remotely driven future, the situation will become even more difficult and confusing for average consumers, many of whom can barely keep up with the clutter today.

There have been limited attempts to improve this less than optimal situation. Various "universal" remote control devices are commercially available, particularly in the consumer electronics industry. These remote control devices allow for some degree of uniformity when controlling similar or complimentary devices, such as, for example, televisions, A/V receivers, DVD players and the like in a home theater system. However, universal remote controls usually require a time consuming programming or "learning" phase in order to "teach" the remote control device how to control the various products. As can be expected, the process is often complicated and usually requires involvement well beyond the expectations of the average consumer. Further, the capabilities of each of the individual remote control devices are often so specialized and manufacturer-specific that, although the universal remote control device may be able to learn the more basic features, other remote control features that are unique and/or proprietary will still require the use of the OEM remote control device. Therefore, the universal remote control device does not provide a solution to the proliferation of remote control devices in most situations. In fact, a universal remote control device may further confuse the situation by creating ambiguities as to which remote control device can perform a specific function for a particular product. As such, the universal remote control device has so far only been able to provide a limited solution for remote control clutter in a rather narrow consumer product area.

There have also been attempts by various manufacturers to provide broader home and/or commercial building automation systems. For the most part, these attempts have been either very expensive, very rudimentary, or both. For example, many of these automation systems have been slow, unreliable and lacking in security because, for the most part, no uniform standard for compatibility has been established on an industry-wide scale. As such, the home/commercial building automation industry remains a collection of niche markets for either the very technically inclined and/or the very wealthy. To change this collection of niche markets into a single market large enough to achieve economies of scale suitable for mass production, a standard communication protocol, suitable for many or most sensing and actuating applications, is needed. Such a protocol must be flexible enough to meet the needs of the individual applications, while still remaining economically viable.

Recently, various wireless communication standards with capabilities beyond the traditional infrared-based remote control device have become available for a variety of applications, most notably broadband Internet access. For instance, the recent development of the Wi-Fi™ wireless local area network (WLAN) communication standards, IEEE 802.11(a)(b)(g), has vastly increased the capabilities of the notebook computers though the use of standardized medium range wireless routers. Wi-Fi™ is tailored toward high data rate Internet and local area networking and is useful for some home automation applications, particularly the control of more complex products such as multimedia computers and security cameras that require large data throughput rates.

Another recent wireless technology standard is Bluetooth®. Bluetooth® is a short range wireless personal area network (WPAN) standard, IEEE 802.15.1, that has uses for cable replacement and product interoperability in a close range environment, such as between a cellular telephone and an automobile hands-free speaker system. However, Bluetooth® networks have a limited range: They may have at most eight devices, with limited power output, and Bluetooth® has no standardized mechanism for relaying transmitted packets from source to destination by multiple intermediate devices (so-called "multi-hop routing"). This range limitation limits the utility of Bluetooth® in many applications, from consumer electronics to appliances, sensors and actuators, that may exist in a typical home or building automation system.

The performance metrics valued in a personal area network designed to meet the requirements of sensing and actuating applications are separate from those valued in Wi-Fi™, Bluetooth® and the like. For example, those standards typically value data throughput rates and channel efficiencies (i.e., the number of information bits per second transmitted per Hertz of occupied frequency spectrum) above other metrics such as power consumption and implementation cost. For example, typical Wi-Fi™ implementations can consume more than 100 milliwatts of power and are required to store a protocol stack that is 100 kilobytes (KB) or more in size, a requirement that places a lower bound on the implementation cost of the device. However, the power and memory necessary to achieve high data throughput rates and high channel efficiencies such as for Wi-Fi™ applications, is not necessarily so critical for sensing and actuating applications. Instead, network devices in sensing and actuating applications are more likely to require long battery life (low power consumption) and low cost. Since these networks may consist of tens to perhaps thousands of devices, and may be attached to very inexpensive sensors and actuators, to be economically viable it is important that the devices themselves be extremely inexpensive and that battery replacement be as infrequent as possible. Should power consumption reach low enough levels, it is possible in some applications for devices to scavenge energy directly from their environment (via sunlight, vibration, or other means), eliminating the need for batteries entirely and greatly enhancing the practicality and economic viability of the network.

More specifically, a personal area network designed for sensor and actuator applications may consist of three generalized device types. The first device type is a network coordinator which maintains overall network knowledge such as the network identification. This device will require the most memory and computing capabilities and, for large networks, may have the same memory capabilities as devices common to Wi-Fi™, Bluetooth® or other radio communication networks.

A second device type is the "fully functional" device. The fully functional device is the most flexible device type because it can function as a limited network coordinator or as an end device at points where the network interacts with the real world (e.g., a user interface). For example, a garage door opener remote control device may be a fully functional device. A key function of the fully functional device is that, like the network coordinator, it can relay messages intended for other devices in the network.

The final general device type is the "reduced function" device. This type of device is extremely low cost because it carries limited memory and computing power. It is an end device such as a window sensor in a security system. The main priority for a reduced function device is to conserve power until a trigger event occurs.

Most of the data that flows between devices in a network primarily consisting of sensors (i.e., lighting, security systems) and actuators (i.e., remote control devices, building control systems) consists of small packets that either periodically control a particular device or group of devices or obtain status information from a device or group of devices. For the most part, the status information generally consists of querying whether the device or group of devices is on or off. For example, a smoke detector or a window contact in a security system will only send information on the network when a trigger event occurs, (e.g., when smoke has been detected or the contact has been broken), or when the operational status of the device is requested. Thus, for the vast majority of the time, these devices operate under minimal power to maintain their reliability, which essentially means staying in a "deep sleep" mode to not run out of battery power before a trigger event occurs.

An automation network should be designed to support various traffic topologies including local any-point to any-point communication, data gathering from a large network and control of a large network from a single or a few points. For example, local any-point to any-point communication may be useful in applications such as lighting control, entertainment system control (e.g., television, DVD player, A/V receiver, cable/satellite receiver, etc.), home and building automation, office/commercial control, human interface devices, home security, HVAC systems and the like. Data gathering from a large network may include environmental monitoring, security sensing, building automation and monitoring, military sensing, office/commercial control, structural monitoring, equipment monitoring, amusement park automation, utility metering, large area sensing and precision agriculture. The control of a large network by a single or a few points may include various building automation and office control functions. As one might expect, many applications may require a combination of network traffic topologies.

Another aspect of an automation network is that the devices, particularly remote control devices, may be mobile within or at the edges of the network area. A typical household area of operation is about 30-70 meters and perhaps more for building control operations and remote sensing applications. Therefore, the network has to be able to accommodate flexible network configurations such, as for example, star, mesh or hybrid network configurations. In addition, networks may consist of devices from many different manufacturers, having varying features and differing amounts of memory.

The need to support a wide variety of applications, with a wide variety of network configurations, implies that the algorithm used to route packets in the network must also be flexible. Many existing algorithms, such as the ad hoc on-demand distance vector (AODV) routing protocol developed by the Mobile Ad Hoc Networking Working Group of the Internet Engineering Task Force (http://www.ietf.org/internet-drafts/draft-ietf-manet-aodv-13.txt), require the use of a "route table" to store route information to each destination device. However, for personal area networks designed for sensor and actuator applications the cost of the memory needed for this table becomes excessive for even moderately-sized networks. In addition, the latency associated with first discovering the route can adversely affect the network user experience. For example, a discernable delay between the time a newly-purchased wireless light switch is used and the time the light comes on, may lead the inexperienced user to believe his switch is faulty. Other existing algorithms, such as the tree-based algorithm described in U.S. Pat. Appl. No. 2003/0227931 to Chen et al., do not employ route tables, but find routes that are not necessarily the shortest available, thereby unnecessarily delaying packet delivery and again negatively affecting the user experience.

What is needed is a communications system that accommodates devices of varying capabilities, from coordinator devices to reduced function devices that have very low power requirements and limited memory capabilities. The communication system needs to exhibit flexibility to accommodate additional devices as they come within range of the network, but with better communication reliability than what is presently available. Further, the communication system needs to exhibit flexibility to satisfactorily accommodate a wide variety of potential applications, each with differing requirements for message latency, network size, and device cost. In addition, a need exists for a communication system capable of routing data by taking advantage of the network topology and the varying capabilities of the network devices.

SUMMARY OF THE INVENTION

Embodiments of the invention include methods, apparatuses and articles of manufacture for routing data in a personal area network. In one embodiment, the invention describes a routing method for data in a personal area network that includes a plurality of routers. The method includes receiving a data packet at a router, determining whether the router contains a routing table entry for the packet destination, and when the router contains a routing table entry, determining a route for the data packet based on a first routing protocol. The method further includes, when the router does not contain a routing table entry for the packet destination, determining whether a route should be discovered for the packet destination, and when a route should not be discovered, determining a route for the data packet based on a second routing protocol.

BRIEF DESCRIPTION OF THE DRAWINGS

A more complete appreciation of the disclosure and many of the attendant features and advantages thereof will be readily obtained as the same become better understood by reference to the following detailed description when considered in connection with the accompanying drawings, wherein:

FIG. 4 illustrates an exemplary routing table used in table-based routing algorithms according to various embodiments of the invention.

FIG. 5 illustrates an exemplary route discovery table used in table-based routing algorithms according to various embodiments of the invention.

FIG. 8 illustrates an exemplary route request command (RREQ) frame according to various embodiments of the invention.

FIG. 9 illustrates an exemplary route reply command (RREP) frame according to various embodiments of the invention.

DETAILED DESCRIPTION

Figure 1:
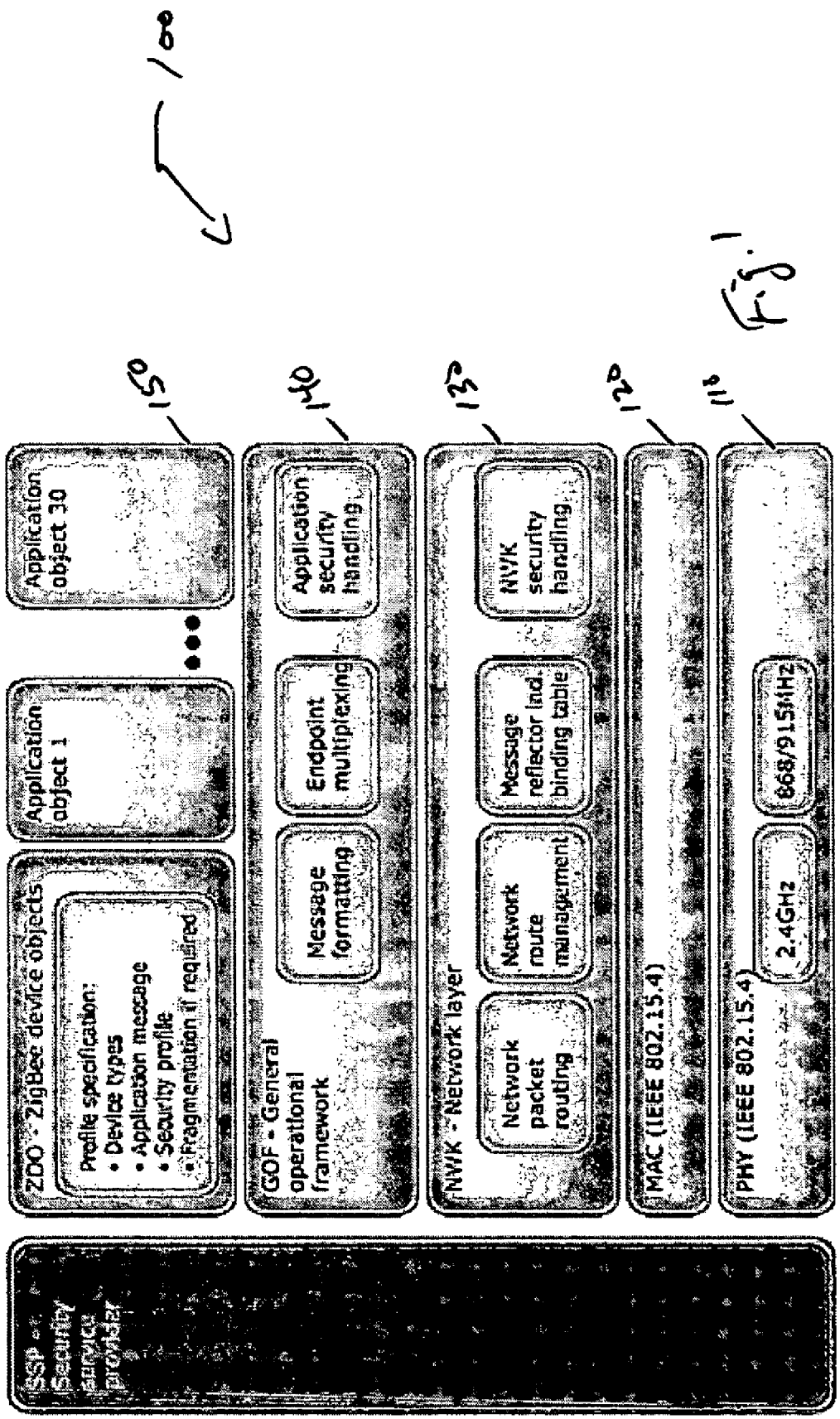
FIG. 1 illustrates a logical network protocol stack according to embodiments of the present invention.

The invention will be discussed with reference to preferred embodiments of apparatuses, methods, and articles of manufacture for routing data in a personal area network. Specific details are set forth in order to provide a thorough understanding of the invention. The term "invention" should not be considered as limiting to a particular embodiment or implementation being described, to the contrary, should be considered to include any and all embodiments, adaptations and/or variations thereof. The preferred embodiments discussed herein should not be understood to limit the invention. Furthermore, for ease of understanding, certain method steps are delineated as separate steps; however, these steps should not be construed as necessarily distinct nor order dependent in their performance. Embodiments of the invention may be comprised of any combination of hardware, software and/or firmware. Accordingly, individual elements and/or combinations of elements in the drawings may be embodied in many different ways, as is well known to those of ordinary skill in the art.

As part of the detailed description of the invention, it will be helpful to have a basic understanding of the infrastructure upon which the invention may be implemented. Specifically, the IEEE 802.15.4 low-rate wireless personal area network standard is a radio communication protocol upon which the invention may be implemented. One skilled in the art will recognize that other communication protocols upon which the invention may be implemented are possible, but for the embodiments presented herein, the IEEE 802.15.4 wireless protocol can be assumed. The description that follows will first describe the basic IEEE 802.15.4 wireless protocol and then the various embodiments of the invention that may be implemented utilizing the IEEE 802.15.4 wireless protocol.

The IEEE 802.15.4 wireless protocol for personal area networks is used to convey information over relatively short distances. The protocol generally follows the Open Systems Interconnection (OSI) reference model wherein the protocol stack architecture is structured in layers. FIG. 1 illustrates a protocol stack for implementing the present invention according to the IEEE 802.15.4 wireless personal area network protocol. The protocol stack 100 includes a physical (radio) layer 110 and medium access control (MAC) layer 120. The additional layers, including the network layer 130, application support layer 140 and application layer 150 are not specified in the IEEE 802.15.4 wireless protocol and may be configured to implement the invention described herein. In general, applications that are compatible with the IEEE 802.15.4 wireless protocol may operate in unlicensed radio communication bands including the 2.400 to 2.4835 GHz ("2.4 GHz"), 902 to 928 MHz ("915 MHz"), and 868.0 to 868.6 MHz ("868 MHz") bands. Raw data throughput rates of 250 kbps may be achieved at the 2.4 GHz band, 40 kbps at the 915 MHz band, and 20 kbps at the 868 MHz band. The radio transmission range is between 10 to 75 m. One skilled in the art will note that these figures are given only for example purposes and that throughput data rates and transmission range will vary based on numerous conditions including power output and environmental characteristics.

Figure 2:
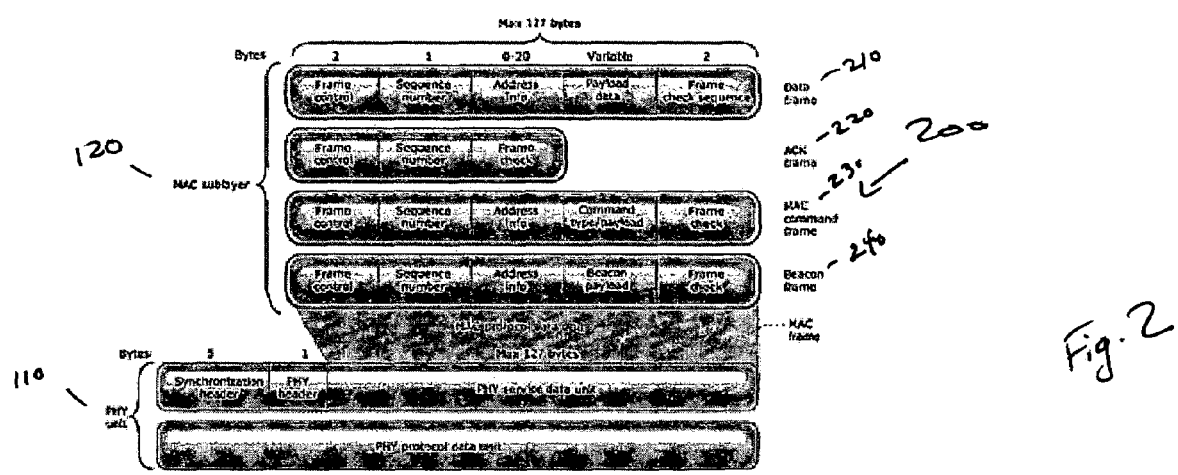
FIG. 2 illustrates a frame structure for a logical network according to embodiments of the present invention.

FIG. 2 illustrates a basic IEEE 802.15.4 wireless personal area network frame structure 200. Within the MAC 120 layer, the IEEE 802.15.4 protocol defines four basic frame structures: a data frame 210, an acknowledgement frame 220, a MAC command frame 230 and a beacon frame 240. Described briefly, the data frame 210 includes control and address information and provides a data payload field. In one embodiment, the data payload may be up to 102 bytes. Each data frame includes a sequence number to ensure that all data transmissions may be tracked. The data frame further includes a frame check sequence to determine whether data packets are received without errors.

The acknowledgement frame 220 provides feedback from a receiving node to a transmitting node to confirm that a data packet was received without error. In operation, a node may take advantage of "quiet time" intervals between frames to transmit an acknowledgement packet confirming the receipt of a data packet immediately after the data packet transmission. The acknowledgement frame 220 may include control, sequence number and frame check fields.

The MAC command frame 230 provides a mechanism for remotely configuring and controlling nodes. For example, a network coordinator may utilize the MAC command frame 230 to configure individual nodes within a network. The MAC command frame 230 includes node address and command type information fields.

The beacon frame 240 may be utilized to wake up required nodes that are in deep sleep mode. For example, when a beacon is sent out, the nodes in the network listen for their address for a period of time and then go back to sleep if they do not receive it. As such, nodes save energy by not having to listen for long periods of time. The beacon frame 240 includes address information of the requested node and beacon payload fields.

The IEEE 802.15.4 protocol includes two channel access mechanisms, non-beacon mode and beacon mode. The main difference between the beacon and non-beacon modes is that the beacon mode provides contention-free channel access while non-beacon mode runs a risk of collisions occurring between transmissions contending for the same channel. In a first "non-beacon" mode, a standard unslotted CSMA-CA (carrier sense multiple access with collision avoidance) algorithm communicates with positive acknowledgment for successfully received packets. In the "beacon" mode, a super frame structure is set up by a network coordinator to control channel access. The super frame structure is set up to transmit beacons at predetermined intervals and, in addition to a slotted CSMA-ca channel access method, provides a predetermined number of time slots between beacons for contention-free channel access, thus guaranteeing dedicated bandwidth and low latency for transmissions. For example, in one embodiment, the super frame structure provides sixteen equal width time slots between beacons.

The IEEE 802.15.4 protocol supports both star and mesh (peer-to-peer) network configurations. The network devices are addressed according to a 64-bit IEEE standard, with an option for 16-bit short addressing. An address field within the MAC layer 120 can contain both source and destination address information to allow for peer-to-peer operation and to prevent single points of failure in mesh networks.

We now turn to the components of the invention wherein, in one embodiment, three general device types for implementing a personal area network are employed.

A network coordinator is a fully functional device (FFD) that is capable of maintaining knowledge of the network identification. This device is often, although not necessarily, the most sophisticated network device and thus typically requires the most memory and power. For example, a network coordinator may have relatively low to medium random access (RAM) and read only memory (ROM) capacity and several kilobytes of non-volatile memory such as flash memory or the like. The network coordinator may accomplish inter-network communications by acting as a gateway between other personal area networks, the Internet or the like.

A fully functional device (FFD) is capable of operating in three modes including network coordinator (described above), coordinator and network device. FFDs may talk to other FFDs and to reduced function devices, which are described below. A key function of FFDs is that, like the network coordinator, they can relay messages intended for other devices in the network. A FFD not acting as a network coordinator may have a lower memory capacity relative to a network coordinator device. As such, FFDs are low power devices. In various embodiments, FFDs may also send beacons.

A reduced function device (RFD) has reduced capabilities relative to the network coordinator and fully functional devices. RFDs have very low memory capacity. An RFD may only talk to an FFD and may not talk to another RFD. They are very low power devices and have little or no routing abilities, as will be described in detail below. RFDs serve primarily as network-edge devices as they specialize in low cost and long duration applications.

Figure 3:
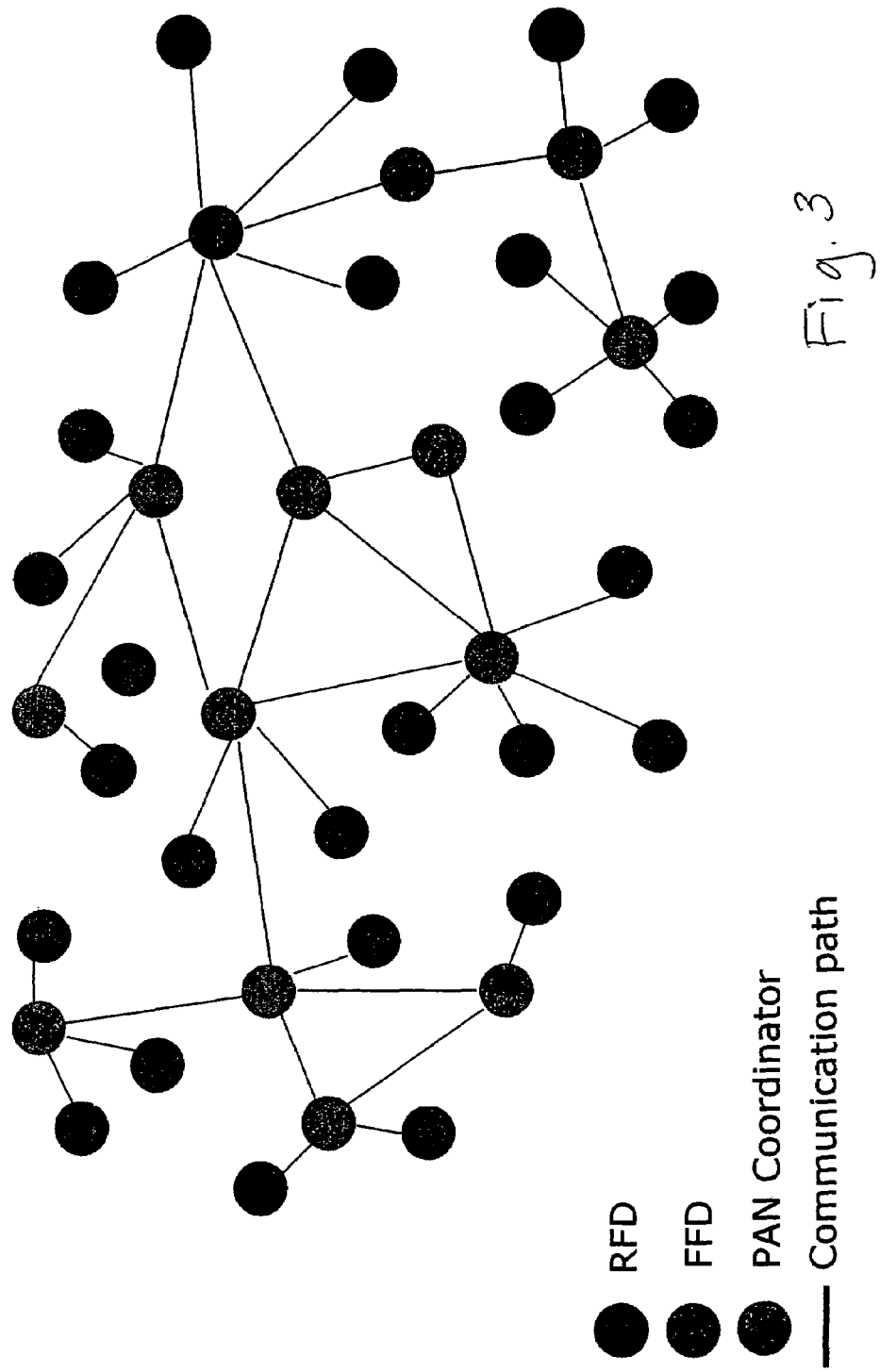
FIG. 3 illustrates a hybrid network according to embodiments of the invention.

Two or more devices within a personal operating space communicating on the same physical (radio) channel constitute a wireless personal area network. FIG. 3 illustrates a typical hybrid network containing each of the network device types for which the invention may be utilized.

For further, more in depth discussion on the IEEE 802.15.4 wireless personal area network protocol and its operation, please refer to the IEEE Std 802.15.4™ 2003, IEEE Standard for Information Technology—Telecommunication and information exchange between systems—local and metropolitan area networks specific requirements—Wireless Medium Access Control (MAC) and Physical Layer (PHY) Specifications for Low-Rate Wireless Personal Area Networks (LR-WPANs), which is incorporated herein by reference.

In preferred embodiments, the invention is implemented in the network layer 130 of an IEEE 802.15.4 wireless personal area network protocol stack. The invention discloses network routing protocols that may be utilized to communicate in a wireless personal area network. More specifically, the invention may be utilized to route data packets between low power, low memory nodes in a star, mesh or hybrid topology short-range, low-cost radio communication network. The invention may be utilized to associate and disassociate nodes and to implement security protocols. Data packets may be routed from peer-to-peer, from many nodes to one node, or from one node to many nodes. The invention may also be utilized to start a new network and to assign addresses to newly associated nodes.

For example and not limitation, an any-point to any-point network (many nodes to many nodes) may be utilized for applications including lighting control, entertainment system control, home automation, building automation, office/commercial environment control, human interface devices, home security and HVAC control. A data gathering network (many nodes to one) may be utilized for applications including environmental monitoring, building automation/monitoring, office/commercial control, structural monitoring, equipment monitoring, park automation, metering, large area remote sensing and precision agriculture. A control network (one node to many nodes) may be utilized for applications including distributing control signals for building automation, office/commercial control and the like.

It should be noted that the word "signal" is used herein to describe an electromagnetic wave that has been modulated in some fashion, usually by the impression of intelligence upon the wave, for example by imposing data upon a carrier wave. It should also be noted that the use of "signal" in the singular includes the plural as often transmitters generate more than one signal in the normal course of their operation.

The invention comprises a method for determining routing options based on the resources of the devices in the network. A first routing option is a solution that requires no routing table at RFDs. Another equally suitable routing option includes a limited routing table entry for source or destination RFDs. The description below describes the various routing options in detail and provide a comparison of the routing options and the situations in which they may be optimally employed. The description further includes illustrations of frame structures that may be utilized to implement various routing commands.

In preferred embodiments, the invention may be utilized to provide an optimized or near-optimized route for signals in a personal area network. For example, the invention can utilize table-based routing in devices whose memory constraints can support tables, enabling optimized routes. The invention can utilize tree-based routing in devices with more restrictive memory constraints that cannot support tables. The various embodiments of the invention will provide a routing solution suitable for a wide range of applications, for personal area networks that include devices with various power and memory constraints.

In one embodiment, the invention utilizes aspects of two routing protocols in order to provide improved routing in a personal area network. While those of ordinary skill in the art will recognize that many other routing protocols are also suitable for performing the operations described herein, in one embodiment, the invention includes a first routing protocol type known as tree-based routing. Described briefly, tree-based routing does not require routing tables in network devices. Instead, the logical topology of the network is exploited to route data between the network nodes. At each node, the next "hop" to the destination is determined by inspection of the destination address. As such, low power FFDs and RFDs require no memory to perform tree-based routing, and thus may be implemented at reduced cost. One example of a tree-based routing protocol suitable for use in the present invention is described in U.S. Pat. Appl. No. 2003/0227931 to Chen et al.

In preferred embodiments, the invention further includes a second routing protocol type known as table-based routing. Table-based routing employs a table of routes at each node linking destination addresses with addresses of one or more neighboring nodes. The next hop to the destination is determined by the inspection of the routing table. One example of a routing table entry is shown in FIG. 4. For example, a routing table entry may include fields for a destination address, route status and the network address of the next hop on the route to the destination.

The resulting route may be optimized for length, power consumption, quality of service, or many other parameters of interest in the network, at the cost of additional memory in the node needed for the table implementation. Such optimization is typically done by evaluating "costs" of various routes, in terms of these parameters of interest, and storing these values in the routing table associated with each destination. A node employing table-base routing will also employ a route discovery table, to monitor the discovery of routes as shown in FIG. 5. For example, a route discovery table may include fields for a sequence number that identifies the route request, a source address, a sender address for the device that has sent the lowest cost RREQ frame, a forward cost for the accumulated path cost from the source to the present device, a residual cost for the accumulated path cost from the present device to the destination, and an expiration time indicating the time until the route discovery expires.

One example of a table-based routing algorithm suitable for the present invention is ad hoc on demand distance vector (AODV) routing, however, those of ordinary skill in the art will recognize that many other routing protocols are also suitable.

The invention further improves routing performance in a personal area network composed of a plurality of device types from, for example, a plurality of manufacturers, and having varying amounts of available memory, by providing a method for each node to independently select the routing protocol type of its choice, while retaining the loop-free, deadlock-free, and livelock-free qualities that are advantageous in a multi-hop routing protocol. For example, the invention provides a method for a node in a multi-hop network to select either a tree-based routing protocol or a table-based routing protocol, based on various criteria such as, for example, its available memory. In addition, the invention further provides a routing method based on a combination of features from various routing protocols that may further improve performance. For example, a node may have insufficient memory to construct a routing table with entries for all nodes with which it must communicate. Such a node would ordinarily have to begin a route discovery process every time it needs to transmit a packet to a node not in its table, leading to a significant latency in communication while the route discovery process is underway and the packet is buffered. In various embodiments, however, the invention provides a node with the option of immediately forwarding a packet using tree-based routing, thereby eliminating a potentially user-discernable delay.

For a complete understanding of the invention, certain terms are utilized to describe a device's positioning with respect to another device. At this point it would be useful to define certain terms as they are used in the context of various embodiments of the invention. A device in the network is termed a node, and a packet in a communication protocol is termed a frame. In a tree-based network, the network coordinator is the highest level node in the network. All of the nodes in the network descend from the network coordinator. A "descendant node" is a node that descends from the network coordinator or other nodes that are between the node and the network coordinator. A "child node" is a direct descendant of a node directly "above" a node along the tree route to the network coordinator. The node directly above the child node is a "parent node." As such, a child node is directly "below" a parent node. A node that descends from the same parent node as does a child node, but is not along the tree route to the network coordinator with regard to a child node is a "sibling node," while a node's "direct ancestor" is a node along a tree route from the node to its network coordinator.

Figure 6:
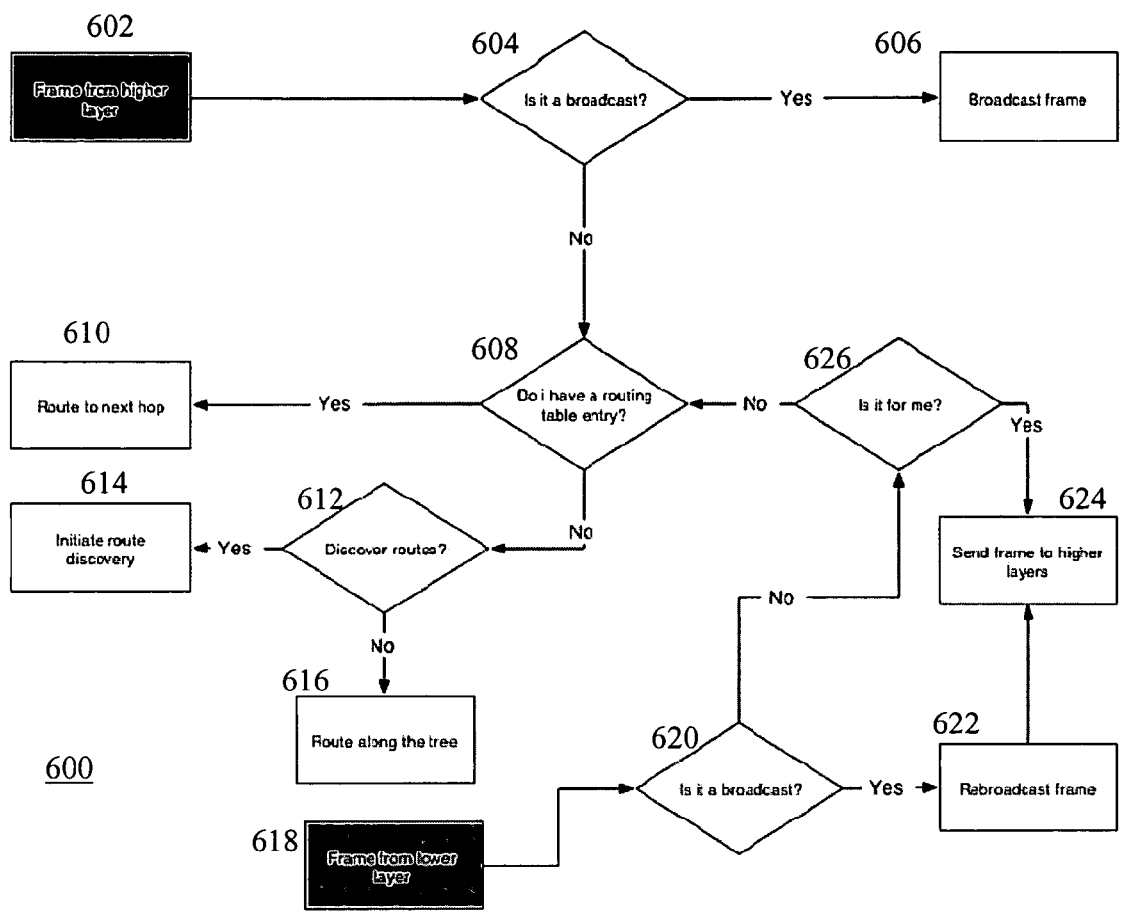
FIG. 6 is a flow diagram illustrating an algorithm for a routing protocol according to various embodiments of the invention.

A flow chart of general routing activity in the network layer 130 of a given node, in accordance with various embodiments of the invention, is shown in FIG. 6. In one embodiment, the network layer 130 may receive a frame from two sources; the layers above and below it in the protocol stack. For example, frames coming from above are to be transmitted and those coming from below have been received. The term "present" node as utilized herein is a description for a node at which the various operations may be performed. In general, the present node may be performing an operation of transmitting or receiving a frame or any combination of such operations. For example, the present node may retransmit a previously received frame if the present node is an intermediate node in a given frame's route path. Furthermore, one skilled in the art will note that the operations herein may be performed by an element or elements other than the present node. As such, the embodiments described in detail below are given for example purposes only, and not limitation.

Consider first a frame arriving at the present node from a higher layer, at step 602. At step 604, the destination address of the frame is evaluated by the present node to determine if the frame is to be broadcast. If the destination address is the broadcast address, the present node broadcasts the frame at step 606. If the destination address is not the broadcast address, the present node searches the routing table to see if there is an entry for the destination address at step 608. If a table entry exists, the information in that entry is used to route the frame to its next hop at step 610. However, if a table entry does not exist (including the degenerate case that the entire routing table does not exist), at step 612 the present node evaluates a flag in the frame header to determine whether a route should be discovered, or not. This route discovery flag enables the upper layer(s) to discriminate between, for example, a frame that is the beginning of a lengthy exchange, for which it would be advantageous to have a routing table entry, and a frame addressed to a unique destination unlikely to be used again, for which it would not be productive to discover and store routing information. If the route discovery flag is set, and the transmitting node is capable of table-based routing, a route discovery procedure, which is described in detail below, is begun at step 614, to begin table-based routing of the frame. If, however, the route discovery flag is not set, or the transmitting node is not capable of table-based routing, the frame is forwarded using tree-based routing at step 616.

Continuing on, consider now a frame arriving at a present node from a lower layer at step 618. At step 620, the destination address of the frame is evaluated by the present node to determine if the frame is a broadcast frame. If the destination address is the broadcast address, the present node rebroadcasts the frame at step 622 and then sends the frame to the higher layer(s) at step 624. If the destination address is not the broadcast address, the destination address of the frame is evaluated by the present node to determine if it is the same as the present node's address at step 626. If the destination address is the present node's address, the frame is sent to the higher layer(s) at step 624. If the destination address is not the same as that of the present node, the present node is an intermediate (i.e., relaying) node in the route and the present node processes the frame as described above in the case of a frame received from a higher layer, beginning with the search of the routing table in step 608.

In the various embodiments of the invention discussed below, routing methods are discussed which utilize RFDs that have no memory for a routing table and other methods are discussed wherein RFDs maintain routing table entries when they are the source or destination node for a data packet. The various embodiments of the invention integrate the elements of various routing protocols while minimizing overhead such as additional control messages. As such, the invention is designed to compliment rather than burden the capabilities of devices that may comprise a low-power personal area network.

In one embodiment, RFDs are not required to perform route discovery by, for example, accessing a routing table. However, FFDs may maintain limited routing tables in order to forward data based on a routing entry. In a preferred embodiment, the FFDs may forward data based on a routing entry by utilizing a table-based routing protocol. In another embodiment, an FFD may act as a "routing agent" or routing proxy for its descendant RFDs, effectively allowing an RFD to share the capabilities of the FFD, further reducing the power and memory requirements for RFDs.

The three basic routing functions that a node can perform include those of a source node, an intermediate node (router) and a destination node. Put simply, a source node is the node that is attempting to send data, a destination node is an intended recipient of the data from a source node and an intermediate node is a node along the route between the source node and the destination node. For example, a multi-hop network many include a plurality of intermediate nodes located on a route between a source node and a destination node.

A multi-hop network may support various routing signals for the purpose of data transmission. For example, a route request signal for an intended destination node may be sent from a source node to determine a route for a frame to be transmitted. A route reply signal may be sent from a destination node to a source node in response to a route request signal. As a result, frame may be sent from a source node to a destination node, or vice versa, based on the network information received from a route reply signal.

In one embodiment of the invention, an RFD does not generally perform route discovery. For example, an RFD may be limited to a tree-based routing protocol. As such, an RFD acting as a source node may only be able to forward a frame along a tree; an RFD acting as an intermediate node may be operable to forward a frame along a tree, forward a broadcast/unicast route request signal from a child or parent node or forward a route reply signal along the tree; and an RFD acting as a destination node may generate a route reply signal upon receiving a route request signal from a child node or a unicast route request signal.

In another embodiment of the invention, an RFD does not perform route discovery and communicates only with its parent node. In still another embodiment of the invention, an RFD does not perform route discovery, but may communicate with its parent node and other neighboring nodes that it can hear directly.

Further, in various embodiments an FFD may have route discovery capabilities. For example, an FFD acting as a source node may forward a frame based on a table-based routing protocol, forward a frame based on a tree-based routing protocol, and record optimal routes in memory based on received route reply signals. An FFD acting as an intermediate node may also perform numerous functions including: forwarding a frame based on a table-based routing protocol, forwarding a frame to a descendant based on a tree-based routing protocol, performing route discovery, broadcasting a route request signal and forwarding a route reply signed, by utilizing either tree-based or table-based routing protocols. An FFD acting as a destination node may reply to a route request signal with the lowest hop count as will be discussed in detail below.

The operation of various embodiments of the invention in various routing scenarios will now be described. It should be noted that while various functions are stated as being performed or determined by a present node or a plurality of nodes in the various figures below, as mentioned above, various methods of performing the steps described herein are possible. As such, one skilled in the art will note that there are many equally suitable methods for performing the steps and that the particular means described are for example only and not limitation.

Figure 7:
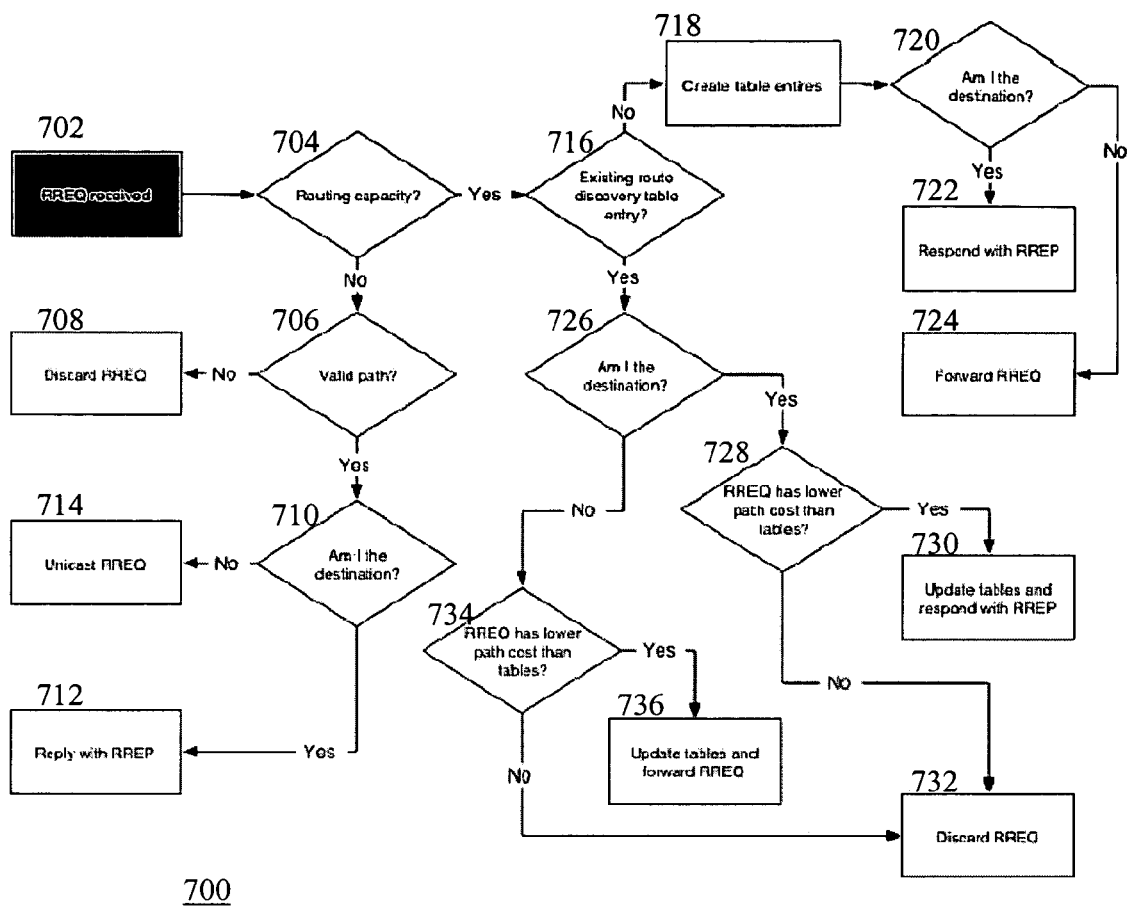
FIG. 7 is a flow diagram illustrating an algorithm for processing route request command (RREQ) frames according to various embodiments of the invention.

As noted above and shown in FIG. 6, the route discovery procedure is initiated at step 614 upon evaluation in the network layer 130 that the route discovery flag in the frame header is set and the transmitting device is capable of table-based routing. A flow chart of the route discovery procedure, in accordance with various embodiments of the invention, is shown in FIG. 7. At step 702, a route request (RREQ) frame is received at a present node (e.g., from step 614 of FIG. 6). In one embodiment, the RREQ frame may be received at the present node from a previous node. As such, the term "received" may include receiving the RREQ frame at a particular layer of the present node from a lower layer of the present node. However, in another embodiment the RREQ frame may be generated, for example, by an upper layer of the present node; in which case the term "received" may include receiving the RREQ frame at a particular layer of the present node from an upper layer of the present node. An exemplary RREQ frame including a frame identifier, command option field, route request identifier, destination address and path cost is shown in FIG. 8.

At step 704, the present node determines whether or not it has routing capacity (i.e., whether or not it can employ a table-based routing protocol). If the present node cannot employ a table-based routing protocol, at step 706 it checks to see if the frame was received along a valid tree path. For example, a tree path is defined to be valid if the frame was received from one of the present node's child nodes and the source node is a descendant of that child node, if the frame was received from the present node's parent node and the source node is not a descendant of the receiving node, or if the frame was generated by the node itself. If the RREQ frame was not received along a valid tree path, the receiving node discards the RREQ frame at step 708. This step avoids the possibility of a loop or other deleterious behavior in the route. If the RREQ frame was received along a valid path, at step 710 the present node checks to see if it is the intended destination. If so, the present node replies with a route reply (RREP) frame at step 712. An exemplary RREP frame is shown in FIG. 9. In the RREP frame, the originator address is set to the address of the present node and the frame is sent to the calculated next hop address, using tree-based routing and considering the originator of the RREQ frame as a destination. The RREP frame further includes the routing cost of this hop (the "link cost" or "path cost"); and the definition of routing cost (i.e., which parameters are of interest), which may be predetermined and fixed within a given network although it may vary from network to network. Should a node not keep a table of routing costs, perhaps due to insufficient allocation of memory, it may employ a default value.

If the present node is not the destination of the RREQ frame in step 710, the present node next computes the link cost from the previous node that transmitted the frame, in a manner similar to that just described. This value is added to the path cost value stored in the RREQ frame. The present node then unicasts the RREQ frame towards the destination in step 714. The next hop for this unicast transmission is determined in the same manner as if the frame were a data frame addressed to the device identified by the destination address field in the payload.

Returning to step 704, if the present node does have routing capacity, in step 716 it checks to see if a route discovery table entry exists with the address contained in the source address field of the RREQ frame. If no such entry exists, then the present node creates one in step 718 with the status "DISCOVERY_UNDERWAY." When creating the route discovery table entry, the fields are set to the corresponding values in the RREQ frame. The only exception is the forward cost field, which, for example, may be determined by using the previous sender of the command frame to compute the link cost and adding it to the path cost contained the RREQ frame. The result of this calculation is stored in the forward cost field of the newly created route discovery table entry. In step 720, the present node determines if it is it is the destination of the RREQ frame by comparing the destination address field of the RREQ frame payload with its own address. If the present node is the destination, in step 722 the present node issues a RREP frame to the source of the route request command frame. If the present node is not the destination of the RREQ frame in step 720, the present node next computes the link cost from the previous node that transmitted the frame, adds the result to the path cost value stored in the RREQ frame, then unicasts the RREQ frame towards the destination in step 724 in a manner similar to step 714.

Returning to step 716, if a route discovery table entry exists with the address contained in the source address field of the RREQ frame, the status of that entry is made to be "DISCOVERY_UNDERWAY." In step 726, the present node determines if it is the destination the RREQ frame by comparing the destination address field of the RREQ frame payload with its own address. If the present node is the destination, in step 728 it determines if the RREQ frame has a lower path cost to the source than is listed in its routing table. If so, in step 730 the present node updates the table and transmits the RREP frame in a manner similar to that of step 712. However, if the RREQ frame does not have a lower path cost, the present node discards the RREQ frame in step 732.

Returning to step 726, if the present node is not the destination, in step 734 it determines if the RREQ frame has a lower path cost to the source than is listed in its routing table. If so, in step 736 the table is updated and the RREQ frame is transmitted, in a manner similar to that of step 714. However, if the RREQ frame does not have a lower path cost, the RREQ frame is discarded in step 732.

Figure 10:
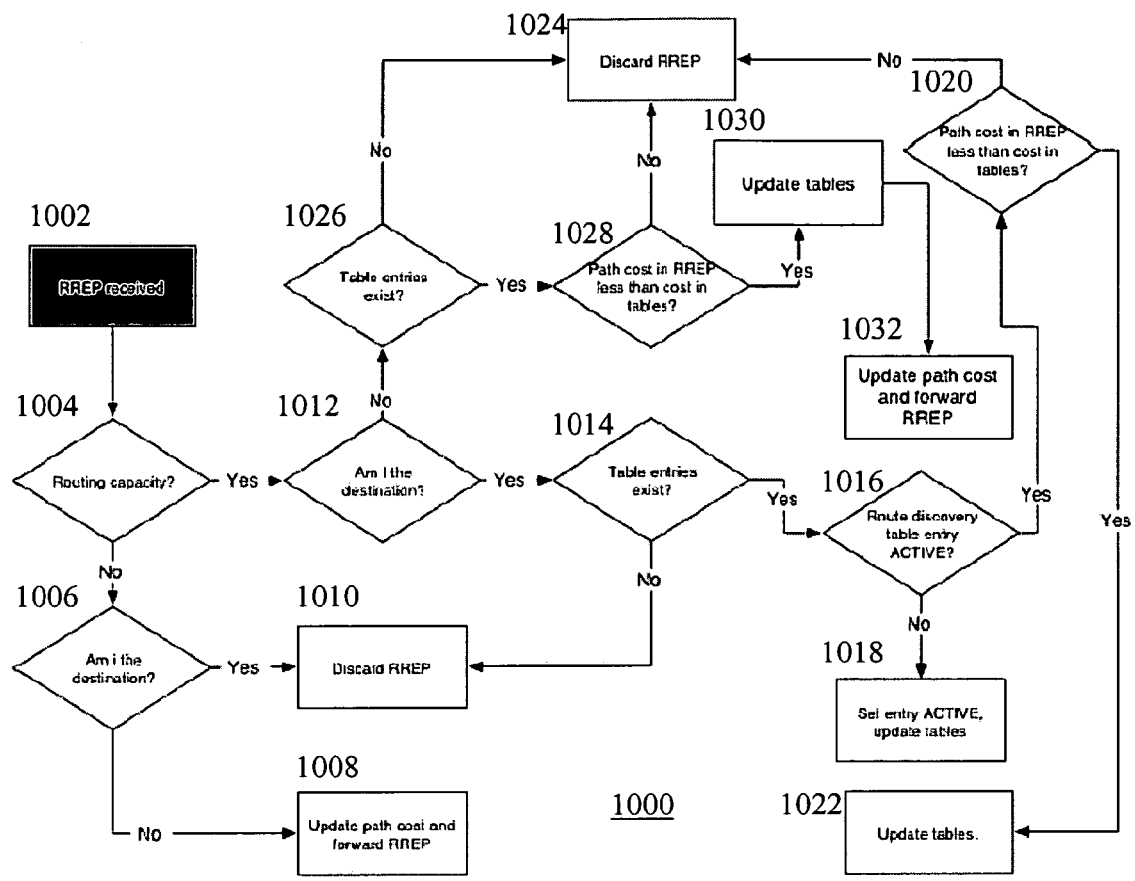
FIG. 10 is a flow diagram illustrating an algorithm for processing route reply command (RREP) frames according to various embodiments of the invention.

FIG. 10 is a flow diagram illustrating an algorithm for a routing protocol according to various embodiments of the invention when a route reply (RREP) signal is received at a node. At step 1002, the RREP frame is received at a present node. As mentioned above in regards to the RREQ frame in FIG. 7, in one embodiment, the RREP frame may be received at the present node from a previous node. As such, the term "received" may include receiving the RREP frame at a particular layer of the present node from a lower layer of the present node. However, in another embodiment the RREP frame may be generated, for example, by an upper layer of the present node; in which case the term "received" may include receiving the RREP frame at a particular layer of the present node from an upper layer of the present node.

At step 1004, the present node determines if it has routing capacity. If the present node has no routing capacity, at step 1006 it determines if it is the destination of the RREP frame by comparing the contents of the originator address field of the RREP frame payload with its own address. If the present node is not the destination, the present node modifies the RREP frame as described above in step 712 (FIG. 7) then forwards the frame using tree-based routing at step 1008. However, if the present node is the destination it discards the frame at step 1010.

Returning to step 1004, if the present node has routing capacity, it then determines if it is the destination of the RREP frame, in a manner similar to that of step 1006 at step 1012. If so, in step 1014 the present node searches its route discovery table for an entry corresponding to the route request identifier in the RREP frame payload. If there is no such entry, the present node discards the RREP frame at step 1010 and route reply processing is terminated. If a route discovery table entry exists, the present node searches its routing table for an entry corresponding to the source address in the RREP frame at step 1014. If there is no such routing table entry the RREP frame will be discarded at step 1010 and, if a route discovery table entry corresponding to the route request identifier in the RREP frame exists, it will also be removed, and route reply processing will be terminated at step 1010. If a routing table entry and a route discovery table entry exist at step 1014, and if the status field of the routing table entry is set to "DISCOVERY_UNDERWAY" at step 1016, the status field is changed to "ACTIVE", the next hop field in the routing table is set to the previous node that forwarded the RREP frame, and the residual cost field in the route discovery table entry is set to the path cost field in the route reply payload at step 1018. If the status field was already set to "ACTIVE" at step 1016, the present node compares the path cost in the RREP frame to the residual cost recorded in the route discovery table entry at step 1020, and updates the residual cost field and next hop field in the routing table entry at step 1022 if the cost in the RREP frame is smaller. If the path cost in the route reply is not smaller, the present node discards the RREP frame route reply at step 1024 and route reply processing is terminated.

Returning to step 1012, if the present node receiving the RREP frame is not the destination, at step 1026 the present node searches for the route discovery table entry corresponding to the originator address and route request identifier in the RREP frame payload. If no such route discovery table entry exists, the present node discards the RREP frame at step 1024.

If a route discovery table entry exists, the present node compares the path cost value in the RREP frame and the residual cost field in the route discovery table entry at step 1028. If the route discovery table entry value is less than the route reply value, the present node discards the RREP frame at step 1024. Otherwise, the present node continues step 1028 and finds the routing table entry corresponding to the destination address in the RREP frame. If the route discovery table entry exists and there is no corresponding routing table entry, the route reply command frame is discarded at step 1024. Otherwise, the routing table entry is updated at step 1030 by replacing the next hop field with the address of the previous node that forwarded the RREP frame. The route discovery table entry is also updated at this step, by replacing the forward residual cost field with the value in the RREP frame.

After updating its own route entry at step 1030, the present node forwards the RREP frame to the destination at step 1032. Before forwarding the RREP frame, the path cost value is updated. For example, the present node finds the next hop to the RREP frame's destination by searching its route discovery table for the entry matching the route request identifier and the source address and extracting the sender address. It uses this next hop address to compute the link cost. This cost is added to the path cost field in the route reply. The destination address in the command frame network header is set to the next hop address and the frame is unicast to the next hop node.

While the invention has been described by illustrative embodiments, additional advantages and modifications will occur to those skilled in the art. Therefore, the invention in its broader aspects is not limited to the specific details shown and described above. Modifications may be made without departing from the scope and spirit of the invention. Accordingly, it is intended that the invention not be limited to the specific illustrative embodiments, but be interpreted within the full spirit and scope of the appended claims and their equivalents.

What is claimed is:

1. A communication protocol for a personal area network, said protocol comprising the steps of:
    receiving a frame at a node;
    selecting a routing protocol based on content of said frame and on resources of said node, wherein selecting said routing protocol further comprises the steps of:
        evaluating a destination address of the frame to determine whether said frame is to be broadcast;
        when said destination address is a broadcast address, broadcasting said frame;
        when said destination address is a non-broadcast address, determining whether a routing table entry exists for the destination address;
            when a routing table entry exists for the destination address, determining a route for said frame based on a table-based routing protocol; and
            when a routing table entry does not exist for the destination of said frame, evaluating a route discovery flag in said content of said frame and evaluating the resources of said node to determine a route for said frame; and
    routing said frame according to the selected routing protocol.

2. The communication protocol of claim 1, wherein said resources comprise at least one of memory capacity and power capacity.

3. The communication protocol of claim 1, wherein said communication protocol further comprises the steps of:
    initiating a route discovery process based on a route discovery procedure when said route discovery flag is in a first state and said node has sufficient resources available for route discovery, and determining a route for said frame based on a tree-based protocol if route discovery flag is evaluated to be in a second state or said node has insufficient resources.

4. The communication protocol of claim 3, wherein said route discovery procedure comprises the steps of:
    determining whether said node has routing capacity;
    determining whether the frame was received along a valid tree path;
    determining whether a source address of said frame is stored within said node;
    determining a destination address of said frame; and
    when said node is determined to have routing capacity, said source address of said frame is not stored within said node, and said node is not the destination of said frame, creating a table entry for said source address within said node, calculating a path cost to the destination address, and unicasting said frame towards said destination address.

5. The communication protocol of claim 4, wherein said calculating a path cost to the destination address comprises:
    adding a link cost from a previous node that transmitted said frame to a path cost stored in said frame.

6. The communication protocol of claim 4, wherein said node is determined to have routing capacity, said source address of said frame is not stored within said node, and said node is the destination address of said frame, said route discovery procedure further comprising issuing a route reply frame to a source of said frame.

7. The communication protocol of claim 4, wherein said node is determined to have routing capacity, and the source address of said frame is stored within said node, said route discovery procedure further comprises the steps of:
    comparing a path cost stored in the frame with a table path cost stored within said node;
    when said path cost stored in the frame is greater than said table path cost, discarding said frame; and
    when said path cost stored in the frame is less than said table path cost and said node is the destination address of said frame, replacing a table path stored within said node with a path stored in said frame and issuing a route reply frame to the source address of said frame.

8. The communication protocol of claim 7, wherein the path cost stored in the frame is less than said table path cost and wherein said node is not the destination address of said frame, said route discovery procedure further comprises the steps of:
    replacing the table path stored within said node with the path stored in said frame and unicasting said frame towards said destination address.

9. The communication protocol of claim 4, wherein said node is determined not to have routing capacity and wherein said frame is not received along said valid tree path, said route discovery procedure further comprising discarding said frame.

10. The communication protocol of claim 4, wherein said node is determined not to have routing capacity, said frame is received along a valid tree path, and said node is not the destination address of said frame, said route discovery procedure further comprising the steps of:
    calculating a path cost to the destination address and unicasting said frame towards said destination address.

11. The communication protocol of claim 4, wherein said node is determined not to have routing capacity, said frame is received along a valid tree path and said node is the destination address of said frame, said route discovery procedure further comprising issuing a route reply frame to a source of said frame.

12. The communication protocol of claim 3, wherein said frame is a route reply frame, said route discovery procedure comprises the steps of:
   determining whether said node has routing capacity;
   determining whether a source address of said route reply frame is stored within said node;
   determining a destination address of said at least one route reply frame; and
   when said node is determined not to have routing capacity and said node is not destination of said route reply frame, updating a path cost in said route reply frame and forwarding said route reply frame.

13. The communication protocol of claim 12, wherein when said node is determined not to have routing capacity and said node is the destination of said route request frame; wherein when said node is determined to have routing capacity, said node is the destination of said route reply frame, and source address of said route reply frame is not stored within said node; or wherein when said node is determined to have routing capacity, said node is not the destination of said route reply frame, and source address of said route reply frame is not stored within said node; said route discovery procedure further comprises discarding said route reply frame.

14. The communication protocol of claim 12, wherein when said node is determined to have routing capacity, said node is not destination of said route reply frame, and source address of said route reply frame is stored within said node; said route discovery procedure further comprising the steps of:
   comparing said path cost in said route reply frame with a table path cost stored within said node; and
   when said path cost in said route reply frame is greater than said table path cost, discarding the route reply frame.

15. The communication protocol of claim 14, wherein said path cost in said route reply frame is less than said table path cost, said route discovery procedure further comprising the steps of:
   replacing a routing table hop field address in said node with an address of a node, that forwarded said route reply frame;
   replacing a forward residual cost in said node with a value stored in said route reply frame;
   updating said path cost in said route reply frame; and
   forwarding said route reply frame.

16. The communication protocol of claim 12, wherein said node is determined to have routing capacity, said node is destination of said route request frame, and source address of said route request frame is stored within said node; said route discovery procedure further comprising the steps of:
   determining whether a status field of a routing table entry is active; and
   when said status field of the routing table entry is not active, changing said status field of routing table entry to active and replacing table path cost in said node with path cost in route reply frame.

17. The communication protocol of claim 16, wherein the status field of the routing table entry is active, said route discovery procedure further comprising the steps:
   comparing said path cost in route reply frame with table path cost in said node; and
   when said path cost in said route reply frame is greater than table path cost in said node, discarding said route reply frame.

18. The communication protocol of claim 17, wherein when said path cost in route request frame is less than table path cost in said node, said route discovery procedure further comprising the steps of:
   replacing said table path cost in said node with said path cost in said route reply frame; and
   replacing said table next hop field address in said node with a next hop address stored in said route reply frame.

19. The communication protocol of claim 1, wherein said node is one of a network coordinator node, a fully functional node, or a reduced function node.

20. The communication protocol of claim 1, wherein said personal area network is one of a tree, star, or hybrid topology network.

21. The communication protocol of claim 1, wherein the evaluating the resources of said node comprises determining whether said node is one of a network coordinator node, a fully functional node, or a reduced function node.

22. The communication protocol of claim 1, wherein said table-based routing protocol comprises an ad hoc on demand distance vector routing protocol.

23. A system for communicating within a personal area network, said system comprising:
   at least one source node for transmitting a frame;
   at least one first intermediate node for advancing the frame to at least one of a second intermediate node and a destination node, wherein said first intermediate node is configured to:
      receive the frame;
      select a routing protocol based on content of said frame and on resources of said first intermediate node, wherein selecting said routing protocol the first intermediate node is further configured to:
         evaluate a destination address of the frame to determine whether said frame is to be broadcast;
         when said destination address is a broadcast address, broadcast said frame;
         when said destination address is a non-broadcast address, determine whether a routing table entry exists for the destination address;
            when a routing table entry exists for the destination address, determine a route for said frame based on a table-based routing protocol; and
            when a routing table entry does not exist for the destination of said frame, evaluate a route discovery flag in said content of said frame and evaluate the resources of said first intermediate node to determine a route for said frame; and
      route said frame according to the selected routing protocol;
   and said at least one destination node.

24. The system of claim 23, wherein said first intermediate node is further configured to:
   initiate a route discovery process based on a route discovery procedure when said route discovery flag is in a first state and said node has sufficient resources available for route discovery, and determine a route for said frame based on a tree-based protocol if route discovery flag is evaluated to be in a second state or said node has insufficient resources.

25. The system of claim 23, wherein when said first intermediate node is one of a network coordinator node, a fully functional node, or a reduced function node.

26. The system of claim 23, wherein said personal area network is one of a tree, star, or hybrid topology network.

27. The system of claim 23, wherein the evaluating the resources of said first intermediate node comprises determining whether the first intermediate node is one of a network coordinator node, a fully functional node, or a reduced function node.

28. The system of claim 23, wherein said resources comprise at least one of memory capacity and power capacity.

29. The system of claim 23, wherein said table-based routing protocol comprises an ad hoc on demand distance vector routing protocol.

30. A communication node within a personal area network comprising:
   means for receiving a frame;
   means for selecting a routing protocol based on content of said frame and on resources of said node, wherein the means for selecting said routing protocol further comprises:
      means for evaluating a destination address of the frame to determine whether said frame is to be broadcast;
      when said destination address is a broadcast address, means for broadcasting said frame;
      when said destination address is a non-broadcast address, means for determining whether a routing table entry exists for the destination address;
      when a routing table entry exists for the destination address, means for determining a route for said frame based on a table-based routing protocol; and
      when a routing table entry does not exist for the destination of said frame, means for evaluating a route discovery flag in said content of said frame and means for evaluating the resources of said node to determine a route for said frame;
   and means for routing said frame according to the selected routing protocol.

31. The communication node of claim 30, wherein said resources comprise at least one of memory capacity and power capacity.

32. The communication node of claim 30, wherein said table-based routing protocol comprises an ad hoc on demand distance vector routing protocol.

33. The communication node of claim 30, wherein said communication node further comprises:
   means for initiating a route discovery process based on a route discovery procedure when said route discovery flag is in a first state and said node has sufficient resources available for route discovery, and means for determining a route for said frame based on a tree-based protocol if route discovery flag is evaluated to be in a second state or said node has insufficient resources.

34. The communication node of claim 33, wherein said communication node further comprises:
   means for determining whether said node has routing capacity;
   means for determining whether the frame was received along a valid tree path;
   means for determining whether a source address of said frame is stored within said node;
   means for determining a destination address of said frame; and
   when said node is determined to have routing capacity, said source address of said frame is not stored within said node, and said node is not the destination of said frame, means for creating a table entry for said source address within said node, means for calculating a path cost to the destination address, and means for unicasting said frame towards said destination address.

35. The communication node of claim 34, wherein said calculating a path cost to the destination address comprises:
   means for adding a link cost from a previous node that transmitted said frame to a path cost stored in said frame.

36. The communication node of claim 34, wherein said node is determined to have routing capacity, said source address of said frame is not stored within said node, and said node is the destination address of said frame, said node further comprising a means for issuing a route reply frame to a source of said frame.

37. The communication node of claim 34, wherein said node is determined to have routing capacity, and the source address of said frame is stored within said node, said node further comprises:
   means for comparing a path cost stored in the frame with a table path cost stored within said node;
   when said path cost stored in the frame is greater than said table path cost, means for discarding said frame; and
   when said path cost stored in the frame is less than said table path cost and said node is the destination address of said frame, means for replacing a table path stored within said node with a path stored in said frame and means for issuing a route reply frame to the source address of said frame.

38. The communication node of claim 37, wherein the path cost stored in the frame is less than said table path cost and wherein said node is not the destination address of said frame, said node further comprises:
   means for replacing the table path stored within said node with the path stored in said frame and means for unicasting said frame towards said destination address.

39. The communication node of claim 34, wherein said node is determined not to have routing capacity and wherein said frame is not received along said valid tree path, said node further comprising a means for discarding said frame.

40. The communication node of claim 34, wherein said node is determined not to have routing capacity, said frame is received along a valid tree path, and said node is not the destination address of said frame, said node further comprising:
   means for calculating a path cost to the destination address and means for unicasting said frame towards said destination address.

41. The communication node of claim 34, wherein said node is determined not to have routing capacity, said frame is received along a valid tree path and said node is the destination address of said frame, said node further comprising means for issuing a route reply frame to a source of said frame.

42. The communication node of claim 33, wherein said frame is a route reply frame, said node comprises:
   means for determining whether said node has routing capacity;
   means for determining whether a source address of said route reply frame is stored within said node;
   means for determining a destination address of said at least one route reply frame; and
   when said node is determined not to have routing capacity and said node is not destination of said route reply frame, means for updating a path cost in said route reply frame and means for forwarding said route reply frame.

43. The communication node of claim 42, wherein when said node is determined not to have routing capacity and said node is the destination of said route request frame; wherein when said node is determined to have routing capacity, said node is the destination of said route reply frame, and source address of said route reply frame is not stored within said node; or wherein when said node is determined to have routing capacity, said node is not the destination of said route reply frame, and source address of said route reply frame is not stored within said node; said node further comprises a means for discarding said route reply frame.

44. The communication node of claim 42, wherein when said node is determined to have routing capacity, said node is not destination of said route reply frame, and source address of said route reply frame is stored within said node; said node further comprising:
    means for comparing said path cost in said route reply frame with a table path cost stored within said node; and
    when said path cost in said route reply frame is greater than said table path cost, means for discarding the route reply frame.

45. The communication node of claim 44, wherein said path cost in said route reply frame is less than said table path cost, said node further comprising:
    means for replacing a routing table hop field address in said node with an address of a node, that forwarded said route reply frame;
    means for replacing a forward residual cost in said node with a value stored in said route reply frame;
    means for updating said path cost in said route reply frame; and
    means for forwarding said route reply frame.

46. The communication node of claim 42, wherein said node is determined to have routing capacity, said node is destination of said route request frame, and source address of said route request frame is stored within said node; said node further comprising:
    means for determining whether a status field of a routing table entry is active; and
    when said status field of the routing table entry is not active, means for changing said status field of routing table entry to active and means for replacing table path cost in said node with path cost in route reply frame.

47. The communication node of claim 46, wherein the status field of the routing table entry is active, said node further comprising:
    means for comparing said path cost in route reply frame with table path cost in said node; and
    when said path cost in said route reply frame is greater than table path cost in said node, means for discarding said route reply frame.

48. The communication node of claim 47, wherein when said path cost in route request frame is less than table path cost in said node, said node further comprising:
    means for replacing said table path cost in said node with said path cost in said route reply frame; and
    means for replacing said table next hop field address in said node with a next hop address stored in said route reply frame.

49. The communication node of claim 30, wherein said node is one of a network coordinator node, a fully functional node, or a reduced function node.

50. The communication node of claim 30, wherein said personal area network is one of a tree, star, or hybrid topology network.

51. The communication node of claim 30, wherein the means for evaluating the resources of said node comprises a means to determine whether the node is one of a network coordinator node, a fully functional node, or a reduced function node.

52. The communication node of claim 30, wherein said resources comprise at least one of memory capacity and power capacity.

53. The communication node of claim 30, wherein said table-based routing protocol comprises an ad hoc on demand distance vector routing protocol.

* * * * *